May 1, 1945.  E. R. KANHOFER ET AL  2,374,819
ALKYLATION OF HYDROCARBONS
Filed June 25, 1943
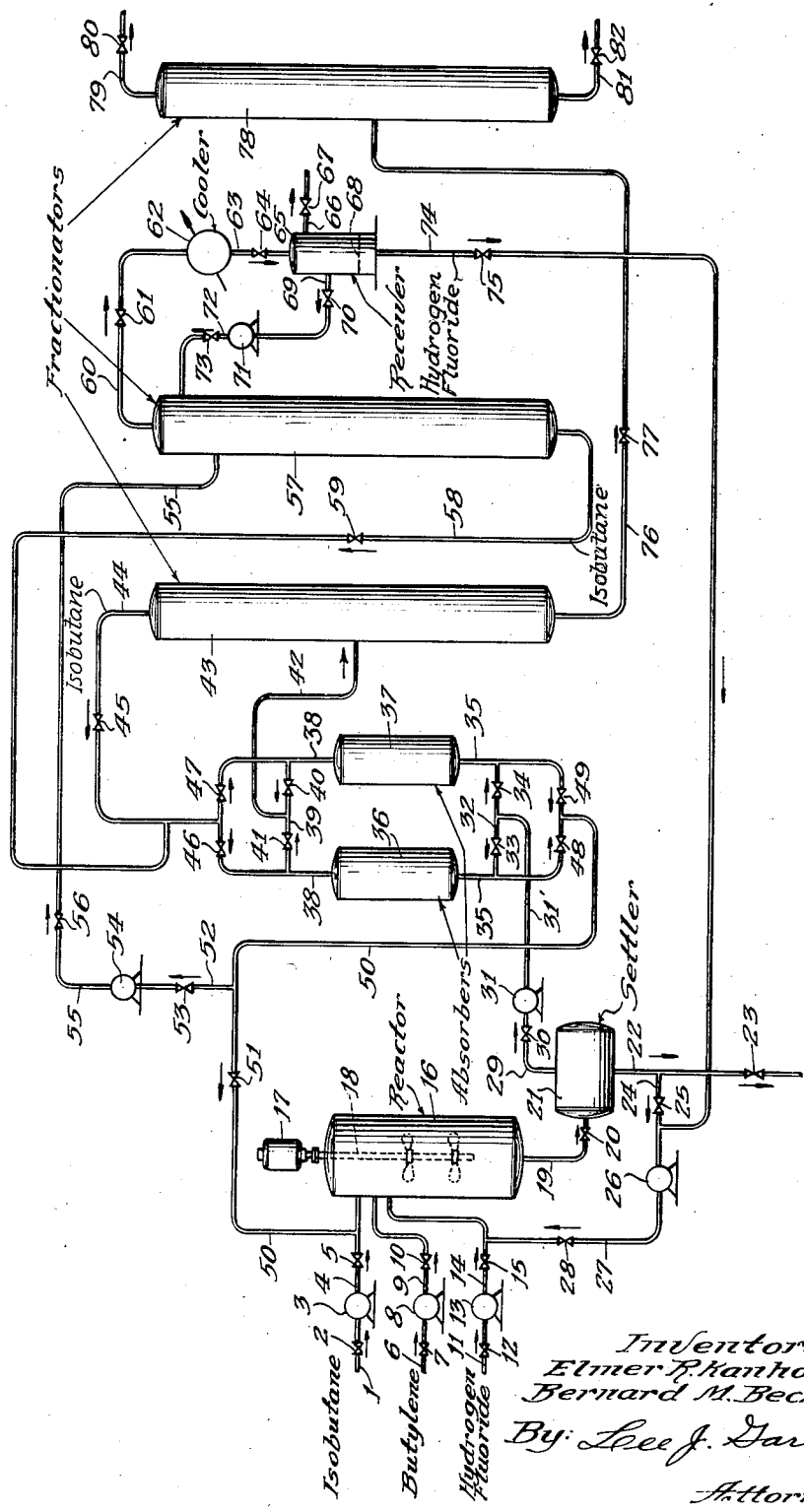
Inventors:
Elmer R. Kanhofer
Bernard M. Becker
By: Lee J. Gary
Attorney Patented May 1, 1945

2,374,819

UNITED STATES PATENT OFFICE 2,374,819

ALKYLATION OF HYDROCARBONS

Elmer R. Kanhofer and Bernard M. Becker, Riverside, Ill., assignors to Universal Oil Products Company, Chicago, Ill., a corporation of Delaware Application June 25, 1943, Serial No. 492,216

8 Claims. (Cl. 260—683.4)

This invention relates to the conversion of hydrocarbons in the presence of a hydrogen fluoride catalyst. It is particularly concerned with a method of treating the hydrocarbon reaction products from an alkylation process employing hydrogen fluoride as a catalyst.

Hydrogen fluoride is a highly effective catalyst for alkylating hydrocarbons such as isoparaffins and aromatics with olefins or other suitable alkylating agents, e. g., alkyl fluorides, alcohols, esters, etc. One process which has achieved commercial importance comprises the alkylation of isoparaffins (particularly isobutane and isopentane) with mono olefins (particularly the normally gaseous propylene and butylenes) in the presence of substantially anhydrous hydrogen fluoride. The reaction is generally carried out by subjecting the isoparaffin, olefin, and hydrogen fluoride catalyst to intimate contact in any of the conventional alkylation reactors well-known to those skilled in the art. The effluent reaction mixture is passed to a settling zone wherein a lower hydrogen fluoride catalyst layer is separated from an upper hydrocarbon layer. The lower catalyst layer may be recycled to the reaction zone or removed from the system for regeneration. The upper hydrocarbon layer is treated for the separation of the desired products.

In general hydrogen fluoride is soluble in paraffinic hydrocarbons to the extent of about one to two per cent dependent upon the temperature. Thus, it is highly desirable to recover dissolved hydrogen fluoride from the alkylation products since its presence will result in corrosion problems during subsequent fractionation steps. Moreover, recovery of the dissolved hydrogen fluoride and its return to the alkylation zone represents an important economic factor in the alkylation process.

One object of the present invention is to provide a method for the recovery of dissolved hydrogen fluoride from hydrocarbon conversion products.

Another object of the invention is to remove dissolved hydrogen fluoride from alkylation products before said products are subjected to the relatively high temperatures which prevail in fractionation operations.

Broadly, the invention comprises removing dissolved hydrogen fluoride from hydrocarbon conversion products by contacting said products with a solid absorbent.

In one specific embodiment the invention consists of a catalytic alkylation process comprising the steps of reacting an isoparaffin with an olefin in the presence of hydrogen fluoride under alkylating conditions, separating the bulk of the used catalyst from the hydrocarbon reaction products in a settling zone, recycling at least a portion of said separated used catalyst to the alkylation zone, contacting said hydrocarbon products containing a relatively small amount of dissolved hydrogen fluoride with a solid absorbent under conditions suitable for selectively absorbing said dissolved hydrogen fluoride, fractionating the hydrocarbon reaction products removed from the absorption step to separate alkylation products from unconverted isoparaffin, subsequently passing at least a portion of said unconverted isoparaffin through said solid absorbent under conditions suitable for desorbing the previously absorbed hydrogen fluoride, and recycling the unconverted isoparaffin and desorbed hydrogen fluoride to the alkylation zone.

In order to simplify the description of the invention the following discussion has been confined to the application of the invention to an isoparaffin-olefin alkylation process. It is to be understood, however, that this method of recovering dissolved hydrogen fluoride from hydrocarbons will also have wide application in various hydrocarbon conversion processes wherein the conversion reaction is conducted in the presence of hydrogen fluoride.

The invention may best be described by reference to the accompanying drawing which illustrates one application of the present invention to an isoparaffin-olefin alkylation process.

Isobutane or a hydrocarbon fraction containing isobutane is introduced through line 1 containing valve 2 to pump 3 which discharges through line 4 and valve 5 into reactor 16. Butylene or a butylene-containing hydrocarbon fraction is introduced by means of line 6 containing valve 7, pump 8, and line 9 containing valve 10. Fresh and/or regenerated hydrogen fluoride is admitted to the system through line 11 containing valve 12, pump 13, and line 14 containing valve 15.

Reactor 16 may comprise any conventional type of apparatus suitable for effecting intimate contact between the hydrocarbons and catalyst. For illustrative purposes, however, the reactor is depicted in the drawing as a mechanically agitated reaction zone containing stirring means 18 operated by motor 17.

The effluent reaction mixture is withdrawn from the reactor through line 19 and valve 20 and is introduced into settling zone 21 wherein an upper hydrocarbon layer and a lower catalyst layer are formed. The catalyst layer is withdrawn through line 22 and a substantial portion thereof is recycled by means of line 24 containing valve 25, pump 26, and line 27 containing valve 28 to line 14 and thus returned to the reaction zone. Another portion of the used catalyst may be withdrawn from the system through valve 23 and subjected to a regeneration step not shown.

The upper hydrocarbon layer containing dissolved hydrogen fluoride is withdrawn through line 29 and valve 30 to pump 31 which discharges through line 31' to line 32. Chambers 36 and 37 comprise absorption zones containing a solid absorbent material. One zone at a time is employed for absorption of dissolved hydrogen fluoride, while the other zone previously used for absorption of dissolved hydrogen fluoride is then regenerated in a manner hereinafter described. For purposes of illustration, the hydrocarbon products containing dissolved hydrogen fluoride pass through valve 33 and manifold line 35 into absorption chamber 36. In this case valves 34 and 48 are closed. The effluent hydrocarbon products which are now substantially free of dissolved hydrogen fluoride are withdrawn through manifold line 38, valve 41 in line 39, and line 42 whereby they are introduced into fractionating column 43. Valves 46 and 40 remain closed. In fractionator 43, which is operated as a deisobutanizer, an overhead stream comprising essentially isobutane is removed through line 44 containing valve 45 and is introduced to manifold line 38. The isobutane passes through valve 47 into absorption zone 37 and therein desorbs the previously absorbed hydrogen fluoride. The effluent isobutane containing dissolved hydrogen fluoride passes through manifold line 35 containing valve 49 and thence through line 50 and valve 51 to line 4 whereby it is recycled to the reaction zone. If appreciable quantities of propane are introduced into the system in the charging stock, it will usually be desirable to separate propane by means not shown from the isobutane stream in line 44.

It will be understood that for the most part the reboilers, condensers, receivers, and similar equipment usually associated with fractionators of the type of columns 43, 57, and 78 have been omitted from the drawing.

The bottoms product from column 43 comprising alkylate and normal butane is withdrawn through line 76 and valve 77 and is introduced into column 78 wherein normal butane is removed overhead through line 79 and valve 80 and alkylation reaction products are recovered through line 81 and valve 82. The alkylation products may be subjected to further fractionation, by means not shown, to separate gasoline boiling range products from higher and lower boiling alkylation products.

As an alternative arrangement, a portion of the recycle isobutane stream which is employed for the desorption of hydrogen fluoride from the absorption zones may be subjected to fractionational distillation in a "hydrogen fluoride stripping" column to remove dissolved hydrogen fluoride, and the hydrogen fluoride-free isobutane stream is then recycled to the absorption zone to provide additional desorption capacity. Thus a stream may be diverted from line 50 through line 52 containing valve 53 to pump 54. This pump discharges through line 55 and valve 56 to the stripping column 57. Because of the relatively low solubility of hydrogen fluoride in isobutane and because of the peculiar vaporization characteristics of the isobutane-hydrogen fluoride system it is possible to separate the higher boiling hydrogen fluoride overhead in column 57 from the lower boiling isobutane. An overhead stream comprising hydrogen fluoride and isobutane is removed through line 60 containing valve 61 and is condensed in cooler 62. The condensate passes through line 63 containing valve 64 to receiver 65. If any noncondensable gases are present, these may be withdrawn through a gas release line 66 containing valve 67. The liquid distillate in receiver 65 separates into an upper hydrocarbon layer and a lower hydrogen fluoride layer. The interface is indicated by the dotted line 68. The hydrocarbon layer is usually returned in entirety through line 69 containing valve 70, pump 71, and line 72 containing valve 73 to provide sufficient reflux for column 57. The lower hydrogen fluoride layer is withdrawn through line 74 and valve 75 and is introduced into line 24 whereby it may be returned to the alkylation zone. The isobutane stream, which is now substantially free of dissolved hydrogen fluoride, is withdrawn through line 58 and valve 59 and is then introduced into line 44 to provide additional desorption medium for the absorption zones. It will be seen that this alternative scheme provides a flexible operating arrangement which insures sufficient desorption capacity for the unit over a wide range of conditions.

Although two zones are shown in the drawing, any desired number of absorption zones may be employed in order that while one or more zones are in use for absorption the others may be "regenerated" to recover hydrogen fluoride previously absorbed therein and also to restore absorption capacity. Suitable granular solid absorbents which may be employed comprise such substances as charcoal or activated charcoal of either animal or vegetable origin, activated chars derived from petroleum coke, potassium fluoride, calcined activated alumina, calcined silica gel, calcined diatomaceous earth, bauxite, or any active and porous earth or clay which has been calcined at a temperature sufficient to eliminate a high proportion of moisture.

Although, as shown in the drawing, the direction of flow of the desorbing iso-butane is preferably opposite to the direction of flow used during the absorption step, nevertheless it is within the scope of the invention to employ the same direction of flow in both operations. The temperature of the desorbing isobutane stream is preferably somewhat greater than the temperature of the hydrocarbon layer from the settler in order to provide sufficient stripping or desorption capacity. The absorption step may be conducted, e. g., at a temperature of from about 50 to about 200° F., and at a pressure of from about 50 to about 500 pounds per square inch or higher.

The effluent hydrocarbon layer from settling zone 21 will also contain organically combined fluorine in addition to the dissolved free hydrogen fluoride. In most cases in an alkylation process of this type it will be desirable to treat the hydrocarbon stream removed from the bottom of fractionator 43 and/or from the bottom of fractionator 78 with a suitable treating agent to remove organically combined fluorine. In the present invention under certain conditions of operation the organic fluorine, particularly alkyl fluorides, present in the hydrocarbon layer withdrawn from the settler will be absorbed to some extent in the absorption zones. In subsequent desorption step the alkyl fluorides will be removed and returned to the alkylation zone in the recycle isobutane stream. In the alkylation zone these alkyl halides will interact with isoparaffins to form desired alkylation products.

The alkylation of isoparaffins with olefins in the presence of hydrogen fluoride may be carried out at a temperature of from about 0° F. to 200° F., preferably from about 50° F. to about 150° F. The pressure should be sufficient to maintain the hydrogen fluoride in substantially the liquid phase, e. g., from atmospheric to about 500 pounds per square inch, preferably from about 50 to about 250 pounds per square inch, dependent upon the temperature and other factors. The time factor in the alkylation process is conveniently expressed in terms of "space time" which is defined as the volume of catalyst within the reaction zone divided by the volume rate per minute of hydrocarbons charged to the reaction zone. The space time usually will lie within the range of from about 5 to about 80 minutes, preferably from about 10 to about 60 minutes, although in some cases it may be desirable to extend this range in either direction. It is well-known in the alkylation art that it is desirable to maintain a substantial molar excess of isoparaffin over olefin in the hydrocarbon charging stock to the alkylation process. This procedure tends to suppress polymerization of the olefins and other undesirable side reactions. The iso-paraffin to olefin molar ratio is preferably from about 3:1 to about 10:1 or higher. The volumetric ratio of catalyst to hydrocarbons in the reaction zone is preferably about 1:1 although satisfactory results are obtainable within the range of from about 0.5:1 to about 1.5:1.

Although the alkylation of iso-paraffins with olefins in the presence of hydrogen fluoride is particularly applicable to the alkylation of isobutane and isopentane with propylene and butylenes, it is also applicable to other hydrocarbons. The higher molecular weight homologues of isobutane and isopentane may be employed, or generally speaking, any branched chain paraffin containing at least one tertiary carbon atom per molecule may be employed. The higher molecular weight olefins, such as amylenes, hexylenes, etc., including liquid polymers of the lower boiling olefins, may also be employed in the reaction. Ethylene, however, is much less reactive than the higher molecular weight mono olefins and it is usually necessary to employ boron trifluoride or other additives or promoters in conjunction with hydrogen fluoride in order to obtain satisfactory alkylation.

Although substantially anhydrous hydrogen fluoride is the preferred catalyst for the process it is within the scope of the invention to employ a catalyst containing up to about 10% by weight of water. Excessive dilution with water is undesirable since it tends to lower the alkylating activity of the hydrogen fluoride and also introduces corrosion difficulties.

As an illustrative example of the process, a charging stock comprising on a mol basis 65% isobutane, 23% normal butane, and 12% butylenes is subjected to contact with substantially anhydrous hydrogen fluoride in a mechanically agitated reaction zone. The reaction zone is provided with an internal heat exchanger to maintain the desired reaction temperature. The operating conditions in the alkylation zone are 100° F., 150 pounds per square inch gage, and 30 minutes space time. The reaction mixture is directed to a settling zone wherein a lower catalyst layer is separated and recycled to the alkylation zone.

The upper hydrocarbon layer from the settling zone contains approximately 1% dissolved hydrogen fluoride and is passed through a bed of activated charcoal at a temperature of 100° F. and a pressure of 150 pounds per square inch gauge. Several beds of activated charcoal are provided, and after a period of about 10 hours on stream the hydrocarbon products are diverted to a fresh bed of charcoal. The previously used bed now contains about 5% by weight of absorbed hydrogen fluoride and is subjected to desorption with liquid isobutane.

The effluent hydrocarbons from the absorption step which are now substantially free of dissolved hydrogen fluoride are subjected to fractionation for the separation of uncoverted isobutane. The isobutane condensate from this fractionator is passed at a temperature of 125° F. and a pressure of 125 pounds per square inch gauge through the bed of activated charcoal previously used for absorption. Uner these conditions the absorbed hydrogen fluoride is desorbed and dissolved in the liquid isobutane. This solution is then returned to the alkylation step, preferably with precooling in order to maintain the temperature in the alkylation zone at 100° F.

We claim as our invention:

1. In a process for the alkylation of isoparaffinic hydrocarbons in the presence of a hydrogen fluoride catalyst wherein hydrocarbon reaction products are separated from the bulk of the used catalyst in a settling zone and said hydrocarbon reaction products are then fractionated to separate desired reaction products from unconverted isoparaffin and the latter recycled to the alkylation step, the improvement which comprises passing the hydrocarbon layer from said settling zone through a zone containing a solid absorbent wherein dissolved hydrogen fluoride is separated from the hydrocarbons by selective absorption, subsequently desorbing said absorbed hydrogen fluoride by contacting the solid absorbent with at least a portion of said unconverted isoparaffin prior to recycling of the latter to the alkylation step, and returning the recovered hydrogen fluoride to the alkylation step.

2. The process of claim 1 wherein said solid absorbent consists essentially of activated charcoal.

3. An alkylation process which comprises reacting an isoparaffin with an olefin in the presence of hydrogen fluoride under alkylating conditions, removing dissolved hydrogen fluoride from the hydrocarbon reaction products by contacting said products with a solid absorbent, subsequently desorbing said hydrogen fluoride from the solid absorbent by contacting the latter with isoparaffin, and supplying the desorbed hydrogen fluoride and the last-named isoparaffin to the alkylation zone.

4. An alkylation process which comprises reacting an isoparaffin with an olefin in the presence of hydrogen fluoride under alkylating conditions, separating the bulk of the used catalyst from the hydrocarbon products in a settling zone, recycling at least a portion of said separated used catalyst to the alkylation zone, contacting said hydrocarbon products containing a relatively small amount of dissolved hydrogen fluoride with a solid absorbent under conditions suitable for selectively absorbing said dissolved hyrogen fluoride, fractionating the hydrocarbon reaction products removed from the absorption step to separate alkylation products from unconverted isoparaffin, subsequently passing at least a portion of said unconverted isoparaffin through said solid absorbent under conditions suitable for desorbing the previously absorbed hydrogen fluoride, and recycling the unconverted isoparaffin and desorbed hydrogen fluoride to the alkylation zone.

5. The process of claim 4 wherein said solid absorbent consists essentially of activated charcoal.

6. The process of claim 4 wherein said isoparaffin comprises isobutane and said olefin consists of a mono olefin.

7. An alkylation process which comprises reacting isobutane with a mono olefin in the presence of hydrogen fluoride under alkylating conditions, separating the bulk of the used catalyst from the hydrocarbon products in a settling zone, recycling at least a portion of said separated used catalyst to the alkylation zone, contacting said hydrocarbon products containing a relatively small amount of dissolved hydrogen fluoride with a solid absorbent under conditions suitable for selectively absorbing said dissolved hydrogen fluoride, fractionating the hydrocarbon reaction products removed from the absorption step to separate alkylation products from unconverted isobutane, subsequently passing at least a portion of said unconverted isobutane through said solid absorbent under conditions suitable for desorbing the previously absorbed hydrogen fluoride, recycling a portion of the unconverted isoparaffin containing desorbed hydrogen fluoride to the alkylation zone, subjecting another portion of said unconverted isobutane and desorbed hydrogen fluoride to fractionation, recovering hydrogen fluoride as an overhead product in said fractionation step, removing isobutane substantially free of dissolved hydrogen fluoride as a bottoms product from said fractionation step, and recycling said bottoms product for use in desorbing additional quantities of absorbed hydrogen fluoride from said solid absorbent.

8. The process of claim 7 wherein said hydrogen fluoride recovered as an overhead product in said last named fractionating step is recycled to the alkylation zone.

ELMER R. KANHOFER.
BERNARD M. BECKER.